199.1X
M. Withers,
Mill Spindle.
Patented Aug. 24, 1813.
Perspective View:
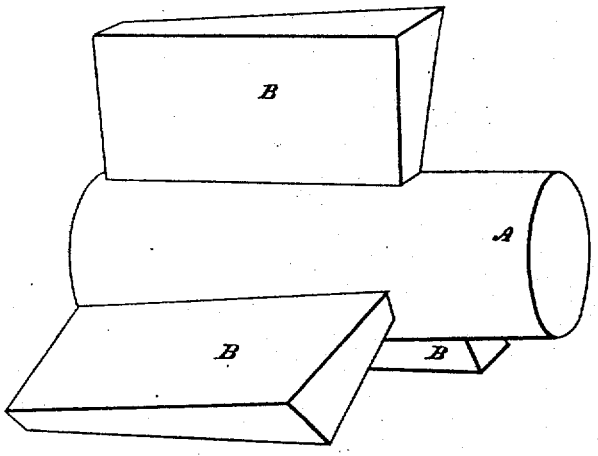
Top View:
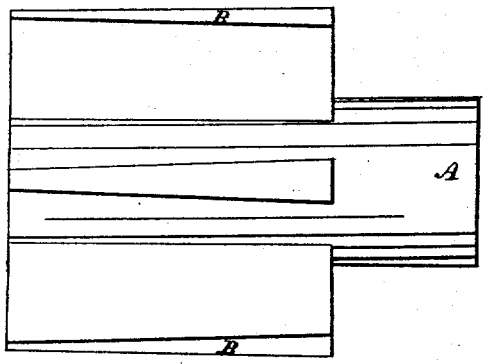
AM. PHOTO-LITHO. CO. N.Y. (OSBORNE'S PROCESS)

To all to whom these presents shall come,

Greeting. 1991X

I certify, that the annexed is a true Copy of a Patent granted to Michael Withers on the 24th of August 1813, for his improvement in the Mill Gudgeon.

In testimony whereof I Henry Clay Secretary of State of the United States have hereunto subscribed my name and caused the Seal of the Department of State to be affixed.

Done at the City of Washington this seventh day of March A.D. 1827. and of the Independence of the United States of America the 51st. H. Clay.

---

The Schedule referred to in these Letters Patent and making part of the same containing a a description in the words of the said Michael Withers himself of his improvement in the Mill Gudgeon These Gudgeons are made of cast iron and consist of a gudgeon with three or more wings that start from the gudgeon at an equal distance from each other and project outwards from six inches to two feet according to the bigness of the shaft said projecting wings are bevelled towards the neck of the Gudgeon. and they also bevel in their thickness on the same side. these bevels are for the purpose of tightening the hoops to prevent the gudgeon coming out; and making the whole fast together it is then fixed to the end of the Mill Shaft. and is fit for operation. Said Gudgeon can be applied to all kinds of [illegible] machinery where it may be found useful Witness
James H Blake
Andw. Way Junr.

Michael Withers

Exd
M.J.C.

[illegible] 1991X

The United States of America
District of Maryland, to wit.

I Thomas Spear Clerk of the Circuit Court of the United States for the fourth cir-
cuit in and for the Maryland District, do hereby certify that the foregoing is a true copy
of an authenticated Copy of a Patent granted to Michael Withey on the twenty
fourth day of August in the year of our Lord one thousand Eight Hundred and thir-
teen and of the Schedule thereunto annexed on file in the office of the said Circuit
Court.

In Testimony Whereof I hereunto subscribe my name
and affix the seal of said Circuit Court this nineteenth
day of August in the year of our Lord one thousand
eight hundred and thirty seven Tho Spear Clk
Circt. Ct.

[illegible]

377 [illegible]